US010506669B2

(12) United States Patent
Ungethuem et al.

(10) Patent No.: US 10,506,669 B2
(45) Date of Patent: Dec. 10, 2019

(54) CONNECTING PART FOR MOUNTING ON TWO HOUSING PARTS AND ARRANGEMENT OF TWO HOUSING PARTS

(71) Applicant: E.G.O. Elektro-Geraetebau GmbH, Oberderdingen (DE)

(72) Inventors: Uwe Ungethuem, Spreenhagen (DE); Frank Graff, Radensleben (DE); Michael Gaertner, Berlin (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 1026 days.

(21) Appl. No.: 14/951,221

(22) Filed: Nov. 24, 2015

(65) Prior Publication Data
US 2016/0150599 A1 May 26, 2016

(30) Foreign Application Priority Data

Nov. 25, 2014 (EP) .................................... 14194773

(51) Int. Cl.
*H05B 6/12* (2006.01)
*F16B 7/04* (2006.01)
*F24C 15/10* (2006.01)

(52) U.S. Cl.
CPC ........... *H05B 6/1245* (2013.01); *F16B 7/042* (2013.01); *F24C 15/104* (2013.01); *H05B 6/1209* (2013.01)

(58) Field of Classification Search
CPC ...... F16B 7/042; Y10T 403/60; Y10T 403/65; Y10T 403/655; H05B 6/12; H05B 6/1209; H05B 6/1245
See application file for complete search history.

(56) References Cited

U.S. PATENT DOCUMENTS

| 2,891,757 | A | * | 6/1959 | Lang | ...................... | A47G 7/044 |
| | | | | | | 248/225.11 |
| 3,297,345 | A | * | 1/1967 | Downing, Jr. | ............ | E04B 9/10 |
| | | | | | | 403/326 |
| 3,679,870 | A | | 7/1972 | Opp | | |
| 4,105,051 | A | * | 8/1978 | Visentin | .................. | E04F 17/04 |
| | | | | | | 138/100 |
| 4,646,497 | A | * | 3/1987 | Hoenle | ................. | E04B 1/6137 |
| | | | | | | 403/334 |

(Continued)

FOREIGN PATENT DOCUMENTS

DE    102013218714 A1    4/2014

OTHER PUBLICATIONS

Flex-Strut Inc., "FTS-200H3 Telescoping Channel, including FTS-200H3, FS-200H3, and FTS-200H3 and FS-200H3 (combination)"; Flex-Strut Engineering Catalog, 2011, pp. 8-9, Flex-Strut, Inc., U.S.A.

*Primary Examiner* — Daniel J Wiley
(74) *Attorney, Agent, or Firm* — Alston & Bird LLP

(57) ABSTRACT

A connecting part for mounting on two housing parts of an induction hob has a U-shaped cross section overall, as a channel, as seen in the longitudinal direction and has two segments. The two segments are connected together in a displaceable manner in the longitudinal direction and are secured captively to one another. The first segment has a front end and the second segment has a front end. The segments each have a connecting means at their front end for connecting to in each case one housing part of an induction hob in a form-fitting manner.

26 Claims, 3 Drawing Sheets

(56) References Cited

U.S. PATENT DOCUMENTS

| | | | | |
|---|---|---|---|---|
| 5,464,302 A | * | 11/1995 | Menchetti | E04C 3/005 403/335 |
| 6,485,219 B1 | * | 11/2002 | Beyer | A47B 87/008 403/338 |
| 7,784,755 B1 | * | 8/2010 | Johnson | E04B 9/006 248/220.21 |
| 2011/0017742 A1 | * | 1/2011 | Sausen | B65D 11/188 220/324 |

* cited by examiner

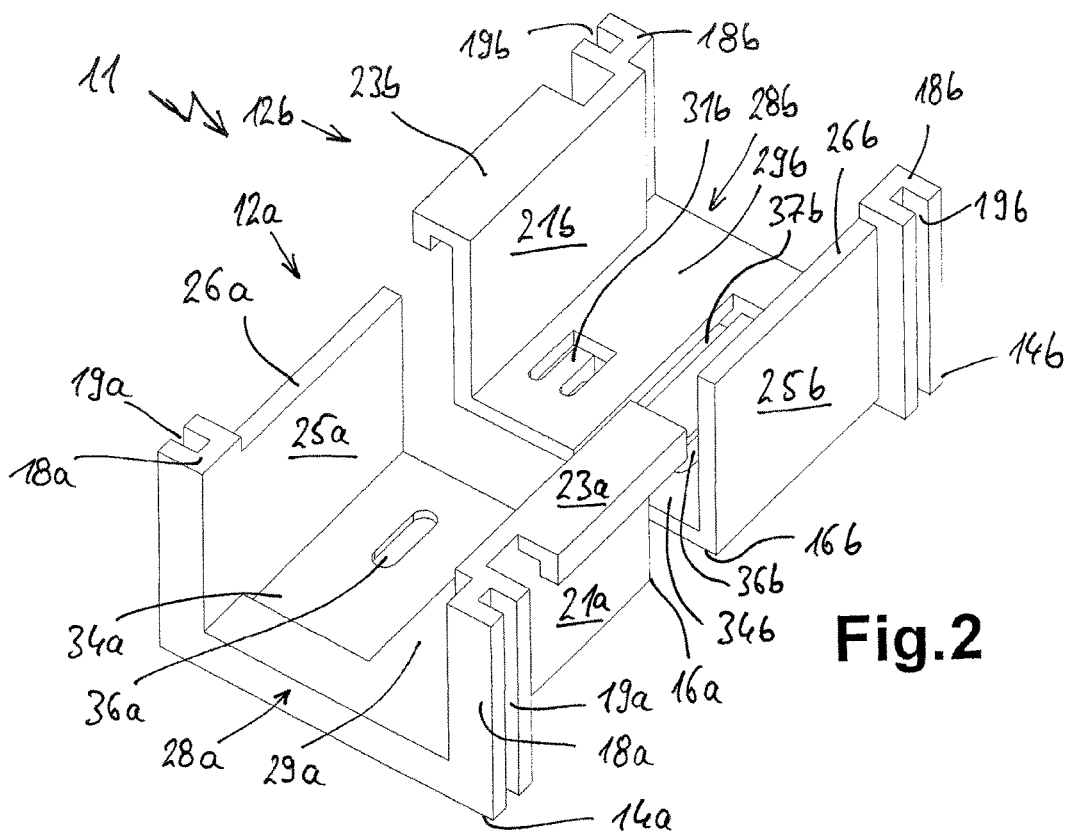
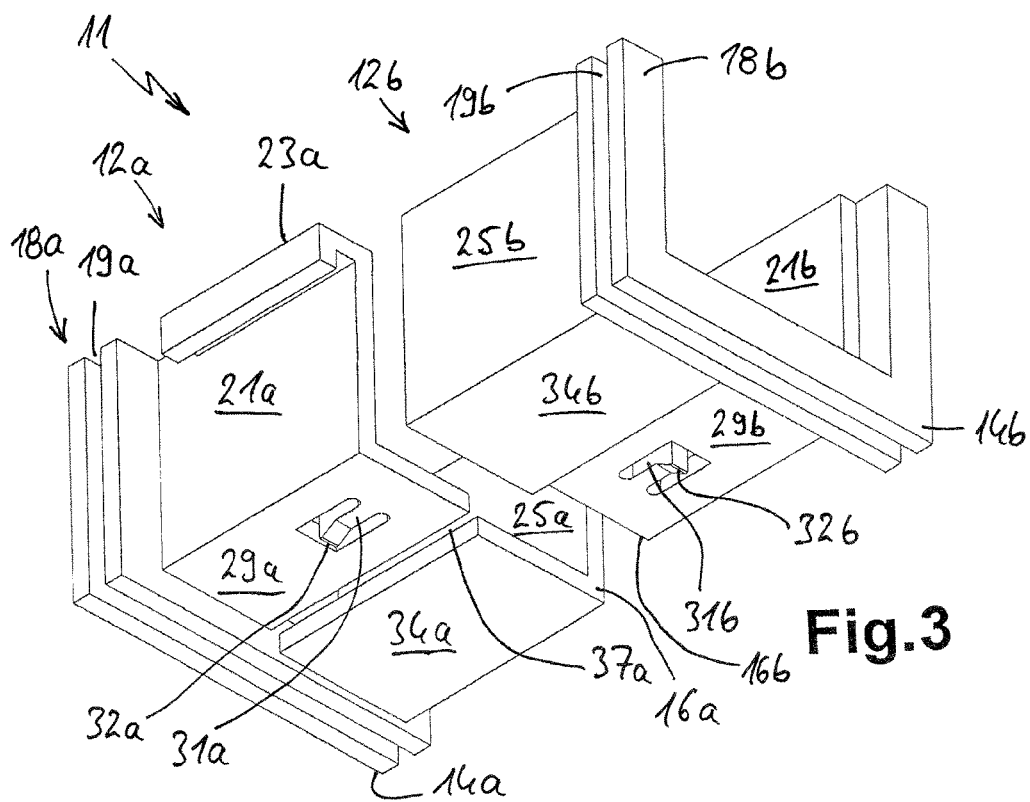

CONNECTING PART FOR MOUNTING ON TWO HOUSING PARTS AND ARRANGEMENT OF TWO HOUSING PARTS

CROSS-REFERENCE TO RELATED APPLICATIONS

This application claims priority to European Application No. 14194773.9, filed Nov. 25, 2014, the contents of which are hereby incorporated herein in its entirety by reference.

TECHNOLOGICAL FIELD

The invention relates to a connecting part for mounting on two housing parts of an induction hob and to an arrangement of two housing parts of an induction hob, having such a connecting part.

BACKGROUND

In induction hobs, two induction heating coils for common operation are frequently aggregated so to speak and arranged together with their control, i.e. corresponding power electronics, in a common separate housing part. This housing part is then arranged under a hob plate of the induction hob, if appropriate on an additional carrier, in the finished induction hob or during the installation thereof. Here, connecting cables generally also have to be guided from one housing part to another. These are exposed to possible damage during the installation of the induction hob and also afterwards during operation.

BRIEF SUMMARY

The invention addresses the problem of creating a connecting part mentioned at the beginning and an arrangement, mentioned at the beginning, of two housing parts having such a connecting part, with which problems of the prior art can be avoided and with which it is in particular possible to configure the connecting part in a simple and safe-to-use manner and also to improve the installation of an induction hob and make it easier.

This object is achieved by a connecting part and by an arrangement. Advantageous and preferred configurations of the invention are the subject matter of the further claims and are explained in more detail in the following text. Here, some of the features are described only for the connecting part or only for the arrangement. However, regardless thereof, they are intended to be able to apply independently to both the connecting part and the arrangement. The wording of the claims is hereby incorporated in the description by express reference.

Provision is made for the connecting part to have a U-shaped cross section overall as seen in its longitudinal direction, that is to say from its connection to the one housing part to its connection to the other housing part, and thus to form a channel. It can thus have a bottom, or channel bottom, and two side walls. In this case, the connecting part, or the channel formed thereby, should have an opening direction which corresponds to that of the housing parts and goes upwards towards the hob plate in the finished induction hob. Therefore, the connecting part, advantageously just like the housing parts, which can be configured in a box-like manner, can be covered or closed off by the hob plate.

Furthermore, the connecting part has two segments. Advantageously, there are exactly two segments, such that the connecting part particularly advantageously consists overall of only the two segments.

According to the invention, the segments are connected together and in the process secured captively to one another, specifically such that they are displaceable in the longitudinal direction, that is to say the length of the entire connecting part can be varied. As a result, different spacings of the two housing parts apart from one another, the spacings being brought about by the type of construction or by installation tolerances, can be compensated, even if each individual segment, or even the connecting part as a whole, is connected to the housing parts precisely in a fixed position. The longitudinal displaceability of the two housing parts with respect to one another, or the variability in length of the entire connecting part, is preferably configured such that it is telescopic. Furthermore, the longitudinal displaceability is advantageously guided, specifically in that it takes place precisely in the abovementioned longitudinal direction, particularly advantageously as a kind of parallel guidance.

The first segment has a front end and the second segment also has a front end. At these front ends, the segments have connecting means by way of which they can be connected to in each case one housing part of the induction hob in a form-fitting manner. The connecting means are thus provided at the end of the connecting part that is the free or front end in the assembled state of the connecting part, specifically in each case one connecting means on each segment. Advantageously, the connecting means, which are described in even more detail below, are formed in an identical manner to one another.

Thus, a connecting part which is connected to the housing parts in each case in a firm, possibly releasable, manner, but in a fixed manner in the installation state and in the fully installed state of the induction hob, is obtained with the invention. The connecting part creates a channel between the two housing parts, the abovementioned cables advantageously being able to extend between the two in said channel. Advantageously, the connecting part is in this case closed continuously and substantially towards the outside apart from the upward opening in order to better protect cables extending therein. As a result of the longitudinal displaceability of the two segments with respect to one another, or as a result of the variability in length of the entire connecting part, the two housing parts can have varying spacings apart from one another and nevertheless be connected together by means of the connecting part. This is an advantage not only in different variants of induction hobs having varying spacings, but also in the case of differences in spacing, brought about by installation tolerances, in the same variants.

In an advantageous configuration of the invention, the connecting part has a releasable latching connection which latches in place when the two segments are pushed together, that is to say when the connecting part is assembled. In this way, the two segments can be prevented from detaching, and in particular they are also secured captively to one another, this being an advantage during the installation operation. As a result of the latching connection, which prevents the segments from being pulled apart, the longitudinal displaceability thereof can be limited. Thus, a longitudinal displaceability of between 1 mm and 20 mm, for example, can be set, it being possible for a number of variants of an induction hob or of arrangements of housing parts with respect to one another to be covered thereby. A lesser degree of longitudinal displaceability, for example between 2 mm and 10 mm, is sufficient primarily to compensate for smaller installation tolerances.

Although an abovementioned latching connection is provided at least once, it is advantageously provided on both segments. Here, the latching connections can be configured in the same or a similar manner, in particular in an identical manner to one another. Both should effect the same maximum longitudinal displaceability, with the result that greater stability is achievable. In addition, the latching connections can serve for exact guidance of the two segments with respect to one another. A latching connection advantageously has a latching arm with a catch on one segment and an associated latching cutout on the other segment. The length of the latching cutout can serve to limit the abovementioned longitudinal displaceability. The latching cutout should have a longitudinal extent in the longitudinal direction, and the direction of movement of the catch on the latching arm can be substantially transverse or at right angles to this longitudinal extent of the latching cutout.

In an advantageous configuration of the invention, the two latching connections are located approximately in a plane. Particularly advantageously, they are provided on an abovementioned bottom of the U-shaped cross section of the connection part, or on a channel bottom. Here, both the two latching arms on the one hand and the two latching cutouts on the other hand should each be located in exactly the same plane.

In one configuration of the invention, guiding devices are provided on the two segments, specifically at least one guiding device, advantageously two guiding devices. A guiding device is particularly advantageously configured in a form-fitting manner, in order to effect exact guidance. Here, provision can preferably be made for a guiding part of a segment to be configured such that it engages over a guiding part of the other segment. In this way, the first-mentioned guiding part can form a kind of groove or channel, advantageously on a side wall, wherein a side wall of the other segment can extend therein as a further guiding device. Such engagement is easy to produce during the installation of the connecting part and effects advantageously defined guidance of the two segments with respect to one another. In an advantageous configuration of the invention, guiding devices are provided on both side walls of the connecting part, specifically one guiding device on each side part, such that advantageous abovementioned parallel guidance is achieved.

Preferably, the connecting part is formed in a U-shaped manner overall and each of the two segments is also formed in a U-shaped manner. Their cross sections can correspond substantially to the longitudinal cross section of the connecting part, apart from the double wall thickness in the finished connecting part on account of the mutually abutting walls of the individual segments.

In a particularly advantageous configuration of the invention, the two segments are formed in a substantially identical manner to one another with regard to the essential functional parts, such as the abovementioned latching connections and the guiding devices, advantageously additionally also the connecting means to the housing parts. Although minor structural deviations are possible, the two segments are particularly advantageously formed in a completely identical manner to one another.

Such similarly or identically configured segments can be assembled in a manner rotated through 180° with respect to one another, such that the finished connecting part consists only of these two segments. Completely identical manufacture makes it possible to simplify production and storage, since only a single part has to be produced.

In the finished connecting part, the segments overlap one another, advantageously in a telescopic manner Although this can be configured such that one segment extends completely within the other segment, an identical configuration of the two segments to one another is then not possible. In order to achieve this, provision can be made for the first segment to be located on the inside and the second segment on the outside in one half and for the first segment to be located on the outside and the second segment on the inside in the other half, as seen in the longitudinal direction of the connecting part. To this end, a central divide between two bottom parts of one segment can be provided at the bottom of the connecting part or of the segments, wherein this divide extends in the longitudinal direction. One bottom part is arranged higher and the other bottom part is arranged somewhat lower. The lower bottom part can be arranged beneath the higher bottom part such that the top side of the lower component extends under the underside of the higher component. Then, when the connecting part is assembled, the lower bottom part of one segment can engage under the higher bottom part of the other segment and vice versa. Thus, it is also possible to plug the two segments together and to configure them in an identical manner. Here, too, a further improvement in the guidance of the two segments with respect to one another can be achieved by the top side and underside of the bottom parts and their exposed side edges bearing against one another in a corresponding manner.

In the abovementioned configuration of the segments with two bottom parts, a latching arm having a catch can be provided on the higher bottom part. It has a longitudinal extent in the longitudinal direction of the connecting part, wherein it is advantageously guided or formed out of the bottom part at that end of the latter that is directed towards the other segment. It thus extends counter to the direction for pushing together the two segments. Its other end is freely movable and has a latching protrusion there, which is directed downwardly, or towards the point at which the lower bottom part of the other segment is provided in the finished connecting part.

In the lower bottom part, a latching cutout is provided on the top side thereof, said latching cutout being either only a depression or an opening. Its longitudinal extent should correspond to that of the latching arm or to that of the longitudinal displaceability. In this way, the catch of the latching arm can move along in the latching cutout during the longitudinal displacement of the two segments with respect to one another once it has been latched in place in this latching cutout. Abutment of the catch at one end of the latching cutout can limit the longitudinal displaceability, in particular the maximum longitudinal displaceability.

In this case, the catch is advantageously configured such that it has a bevel which brings about automatic engagement in the latching cutout when the segments are plugged together. No bevel should be provided in the other direction, such that the engagement of the catch in the latching cutout actually limits the maximum longitudinal displaceability or limits the pulling apart of the connecting part here.

In the abovementioned guiding devices, provision can be made for a downwardly open U-shaped engaging overhang to be formed at the top of a side wall of one segment. Advantageously, the engaging overhang extends outwards. A side wall of the other segment extends with its upper region, or its top edge, in this U-shaped engaging overhang, in particular along the outside of this side wall.

As the abovementioned connecting means of the connecting part or of the segments to the housing parts, outwardly directed U-shaped depressions can be provided at the free ends or the outer ends of the connecting part at least along the side walls of the segments, advantageously also along their bottom. These depressions can be in the form of grooves and engage with corresponding wall protrusions or holding protrusions on the connecting parts. The connecting part or the segments can be fastened to the housing parts advantageously without tools by plugging in or insertion, specifically particularly advantageously with the same direction for both housing parts. Thus, a connecting part can be connected to two aligned housing parts in a single operation. This connection can be configured so as to be releasable without tools, and advantageously can be provided with a safeguard, for example of the latching or clamping type. This can have the effect that a connection of the connecting part to one of the housing parts can no longer be released, or cannot be released so easily, in particular automatically.

The connecting means are advantageously provided on outer walls of the housing parts, particularly advantageously on mutually facing outer walls of the housing parts. In this case, the spacing of the housing parts in this region can be relatively small, advantageously at a minimum, such that the connecting part only has to bridge a limited distance.

A bottom of the housing parts can extend approximately in the same plane as a bottom of the connecting part. In this way, easy guidance of the cables from one housing part via the connecting part to the other housing part is possible.

These and further features are apparent not only from the claims but also from the description and the drawings, wherein the individual features can be realized in each case individually or as a plurality in the form of subcombinations in an embodiment of the invention and in other fields and can constitute advantageous and inherently protectable embodiments for which protection is claimed here. The subdivision of the application into individual sections and subheadings does not restrict the general validity of the statements made thereunder.

BRIEF DESCRIPTION OF THE SEVERAL VIEWS OF THE DRAWINGS

Exemplary embodiments of the invention are illustrated schematically in the drawings and are explained in more detail in the following text. In the drawings:

FIGS. 2 and 3 show oblique views of two identical segments in an arrangement for pushing together as a connecting part;

FIG. 5 shows an oblique plan view of an arrangement according to the invention of two housing parts of an induction hob with a connecting part in between.

DETAILED DESCRIPTION

Figure 1:
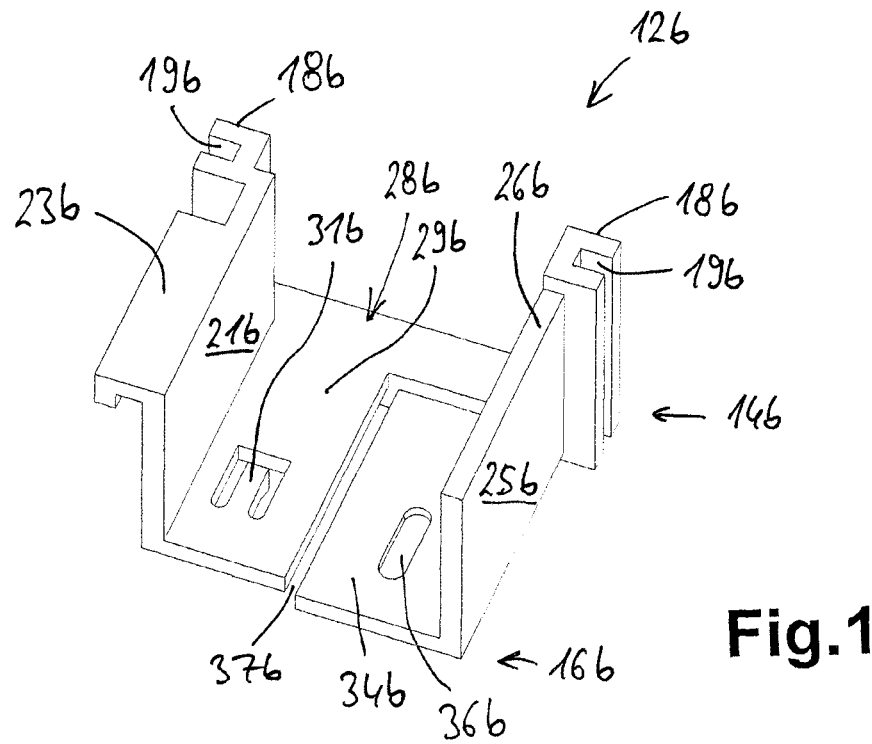
FIG. 1 shows an oblique view of an individual segment for a connecting part.

FIG. 1 illustrates an individual segment 12b, as has been generally described previously. It has a front end 14b and a rear end 16b, wherein a circumferential groove portion 18b with a groove 19b formed therein is provided at the front end 14b. The segment 12b is configured in a U-shape overall and forms a kind of channel. For this purpose, provision is made of a side wall 21b which has an overhang 23b in the manner of an outwardly projecting collar or the like at the top. The overhang 23b forms a kind of groove or guide rail at the bottom. Another side wall 25b is somewhat less high, or its top edge 26b is located somewhat lower than the depression in the overhang 23b.

Formed between the side walls 21b and 25b is a bottom 28b. This bottom 28b has an upper bottom part 29b and a lower bottom part 34b which have a small lateral offset, or a slot 37b, between one another. In this case, the top side of the lower bottom part 34b is provided slightly below the underside of the upper bottom part 29b. Formed in the upper bottom part 29b is a latching arm 31b which has a correspondingly formed catch 32b on its underside at its free end, the catch having a bevel in one direction. Provided on the lower bottom part 34b is an elongate latching depression 36b.

Figure 4:
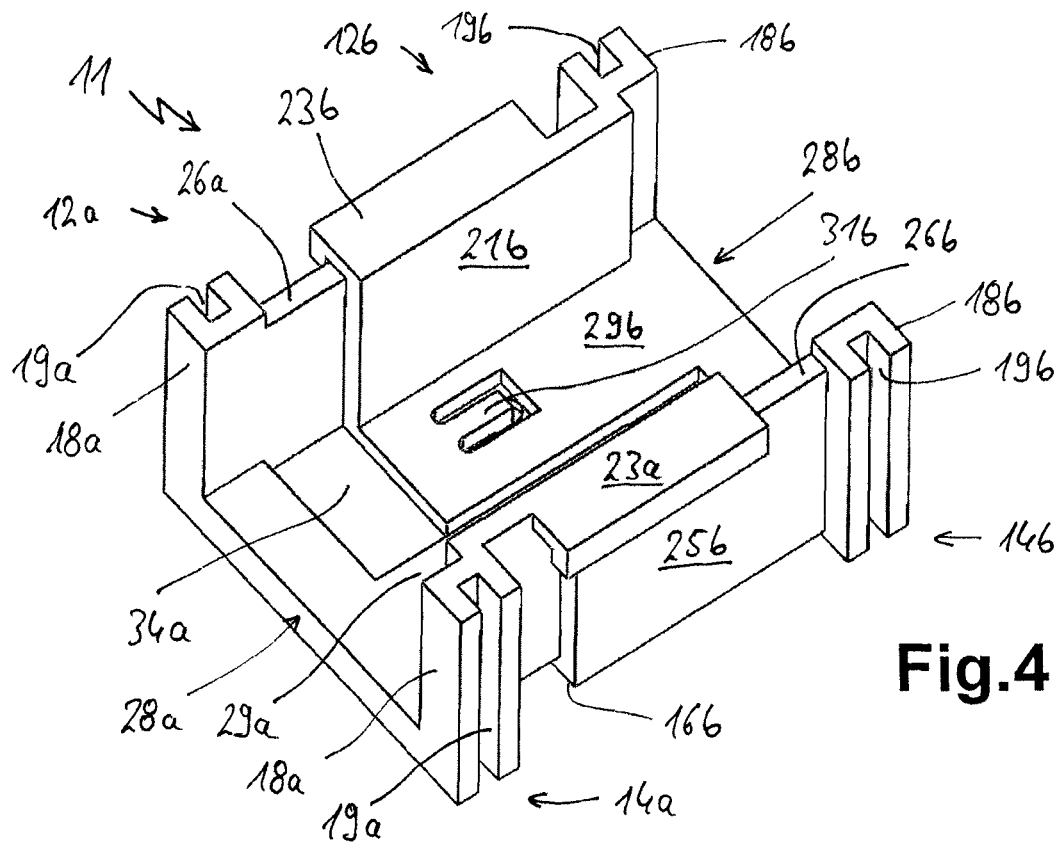
FIG. 4 shows a connecting part formed from the two segments in FIGS. 2 and 3 by pushing together.

FIGS. 2 and 3 show how a further identical segment 12a is attached to the segment 12b in FIG. 1, specifically in a manner rotated through 180° with respect thereto such that the rear ends 16a and 16b are directed towards one another. It can already be seen therefrom how the two segments 12a and 12b engage in one another so to speak in an interlocked manner when pushed together. Then, as FIG. 4 shows in the pushed-together or assembled state, the side wall 21a is located within the side wall 25b, wherein the side wall 21b is located within the side wall 25a. The overhang 23a engages over the top edge 26b with a small spacing or even in abutment, just as the overhang 23b engages over the top edge 26a. The upper bottom part 29a extends over the lower bottom part 34b, wherein the latching arm 31a engages automatically in the latching depression 36b with its catch 32a. In a corresponding manner, the upper bottom part 29b is located over the lower bottom part 34a, the slot 37a also making this easier. Here too, the latching arm 31b is introduced with its catch 32b into the latching depression 36a.

As a result of the interlocked side walls 21 and 25 and bottom parts 29 and 34, a kind of stable and secure longitudinal and parallel guidance of the segments 12a and 12b on the connecting part 11 is provided when they are pulled apart and pushed together. When the connecting part 11 or the segments 12a and 12b are pulled apart from one another, it is quite obvious that the catches 32a and 32b each butt against the latching depressions 36b and 36a and limit the maximum length. For pushing together, this can also be the case under certain circumstances, wherein an abutment is not actually necessary for this purpose and is in fact also settable by the respective lengths of the two segments 12 and the placing of the latching connection.

Figure 5:
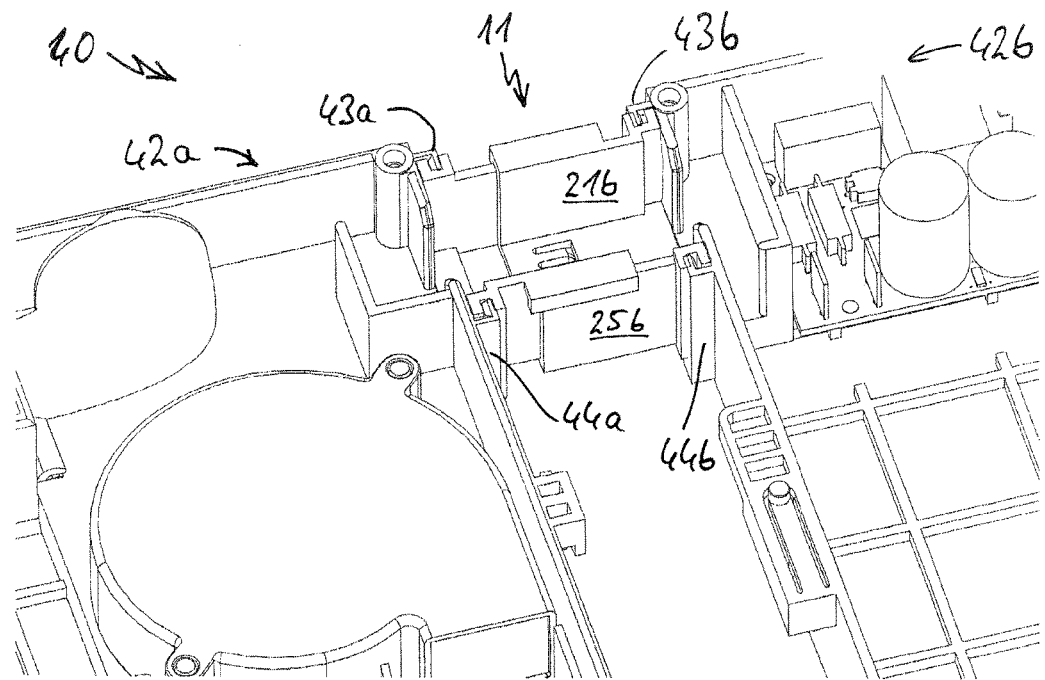
Figure 6:
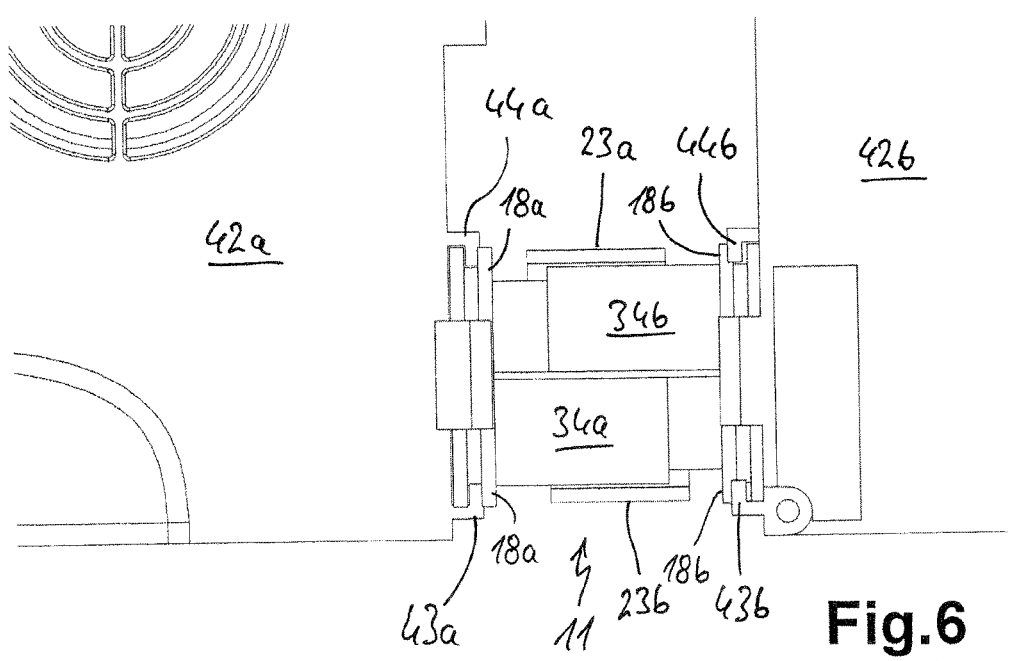
FIG. 6 shows a bottom view of the arrangement in FIG. 5.

FIGS. 5 and 6 illustrate an arrangement 40 according to the invention having two housing parts, 42a on the left and 42b on the right, as are conventionally configured for induction hobs for receiving functional units. In the housing part 42a, a fan 46a is illustrated for example. Provided on the housing parts 42a and 42b are protrusions 43a and 43b and 44a and 44b, respectively. These protrusions are then so to speak inwardly turned angled parts into which, as the view from below in FIG. 6 indicates, the connecting part 11 or the segments 12a and 12b can be pushed from above with the grooves 19 of the groove portions 18. In this case, for better fastening, a kind of clamping or additional latching can be provided, this not being illustrated, but being easy to realize for a person skilled in the art. Downwardly, the connection is limited by protrusions on the underside of the housing parts 42.

It is easy to see especially from FIG. 5 that the spacing of the two housing parts 42a and 42b of the arrangement 40 from one another can now be varied by the adjustability in length of the connecting part 11. A maximum distance apart is specified. In this case, reasonably good parallel guidance is also ensured and thus an additional alignment aid for the housing parts 42 is provided.

That which is claimed:

1. A connecting part for mounting on two housing parts of an induction hob, wherein:
   said connecting part has a U-shaped cross section overall, as a channel, as seen in a longitudinal direction of said connecting part;
   said connecting part has two segments;
   said two segments are connected together in a displaceable manner in said longitudinal direction and are secured captively to one another;
   said first segment has a front end;
   said second segment has a front end;
   said two segments each have a connecting means at their front end for connecting to in each case one housing part of an induction hob in a form-fitting manner; and
   said two segments are formed in an identical manner to one another such that said connecting part has two identical segments which are assembled in a manner rotated through 180° with respect to one another.

2. The connecting part according to claim 1, wherein said connecting part has a releasable latching connection which latches in place when said two segments are pushed together in order to prevent them from being detached from one another.

3. The connecting part according to claim 2, wherein said latching connection is configured such that it allows said two segments to be displaced longitudinally with respect to one another by 1 mm to 20 mm.

4. The connecting part according to claim 3, wherein said latching connection comprises two latching connections, one of said two latching connections being provided on each of said two segments.

5. The connecting part according to claim 4, wherein said two latching connections are located approximately in a plane.

6. The connecting part according to claim 5, wherein both of said two latching connections are provided at a bottom of said U-shaped cross section of said connecting part.

7. The connecting part according to claim 1, wherein at least one form-fitting guiding device is provided on said two segments.

8. The connecting part according to claim 7, wherein at least two form-fitting guiding devices are provided on said two segments.

9. The connecting part according to claim 7, wherein one of said guiding devices is configured such that a guiding part of one segment engages over a guiding part of another segment.

10. The connecting part according to claim 1, wherein a downwardly open U-shaped engaging overhang is formed at a top of a side wall of one of said segments, wherein a side wall of said other segment extends in said U-shaped engaging overhang.

11. The connecting part according to claim 1, wherein each of said two segments is formed in a U-shaped manner with a cross section corresponding substantially to said longitudinal cross section of said entire connecting part.

12. The connecting part according to claim 11, wherein said connecting part consists only of said two segments.

13. The connecting part according to claim 1, wherein a central divide between two bottom parts on one of said segments is provided at a bottom of said connecting part, said central divide extending in said longitudinal direction of said connecting part, wherein one of said bottom parts is arranged higher and another of said bottom parts is arranged lower.

14. The connecting part according to claim 13, wherein said lower bottom part is arranged beneath said higher bottom part such that a top side of said lower bottom part extends under an underside of said higher bottom part.

15. The connecting part according to claim 13, wherein a latching arm having a catch is provided on said higher bottom part, wherein said latching arm leads out of said bottom part at that end of said bottom part that is directed towards another of said segments and is freely movable at its other end and has a downwardly directed latching protrusion there.

16. The connecting part according to claim 15, wherein said latching arm has a longitudinal extent in said longitudinal direction of said connecting part.

17. The connecting part according to claim 13, wherein a latching cutout is provided in said top side of said lower bottom part.

18. The connecting part according to claim 17, wherein said latching cutout has a longitudinal extent along said longitudinal extent of said connecting part.

19. The connecting part according to claim 1, wherein, for connecting to said housing parts, outwardly directed U-shaped depressions are provided, at least along side walls of said segments, in the form of grooves at that end of said segments that is directed away from said other segment, or at outer ends of said connecting part.

20. An arrangement of two housing parts of an induction hob, having a connecting part according to claim 1, wherein said connecting part is connected to in each case one of said housing parts by way of said connecting means at outer ends of said connecting part.

21. The arrangement according to claim 20, wherein said housing parts have housing connecting means, formed in an identical manner to one another, for said connecting part.

22. The arrangement according to claim 21, wherein said housing connecting means are provided on an outer wall of said housing parts in a manner directed towards one another.

23. The arrangement according to claim 22, wherein said housing connecting means are integrally formed on an outer wall additionally in a manner projecting away therefrom.

24. The arrangement according to claim 20, wherein said housing parts have a bottom that extends over substantial regions of said housing parts, said bottom extending substantially in a plane, wherein a bottom of said connecting part also extends in said plane.

25. A connecting part for mounting on two housing parts of an induction hob, wherein:
   said connecting part has a U-shaped cross section overall, as a channel, as seen in a longitudinal direction of said connecting part;
   said connecting part has two segments;
   said two segments are connected together in a displaceable manner in said longitudinal direction and are secured captively to one another;
   said first segment has a front end;
   said second segment has a front end;
   said two segments each have a connecting means at their front end for connecting to in each case one housing part of an induction hob in a form-fitting manner; and
   a central divide between two bottom parts on one of said segments is provided at a bottom of said connecting part, said central divide extending in said longitudinal direction of said connecting part, wherein one of said bottom parts is arranged higher and another of said bottom parts is arranged lower.

26. An arrangement comprising two housing parts of an induction hob, said arrangement further having a connecting part, wherein:
said connecting part comprises:
a U-shaped cross section overall, as a channel, as seen in a longitudinal direction of said connecting part; and
two segments, said two segments being connected together in a displaceable manner in said longitudinal direction and secured captively to one another, said first segment having a front end, said second segment having a front end, and said two segments each having a connecting means at their front end for connecting to in each case one housing part of an induction hob in a form-fitting manner; and
said connecting part is connected to in each case to one of said housing parts by way of said connecting means at outer ends of said connecting part.

* * * * *